United States Patent Office 3,671,187
Patented June 20, 1972

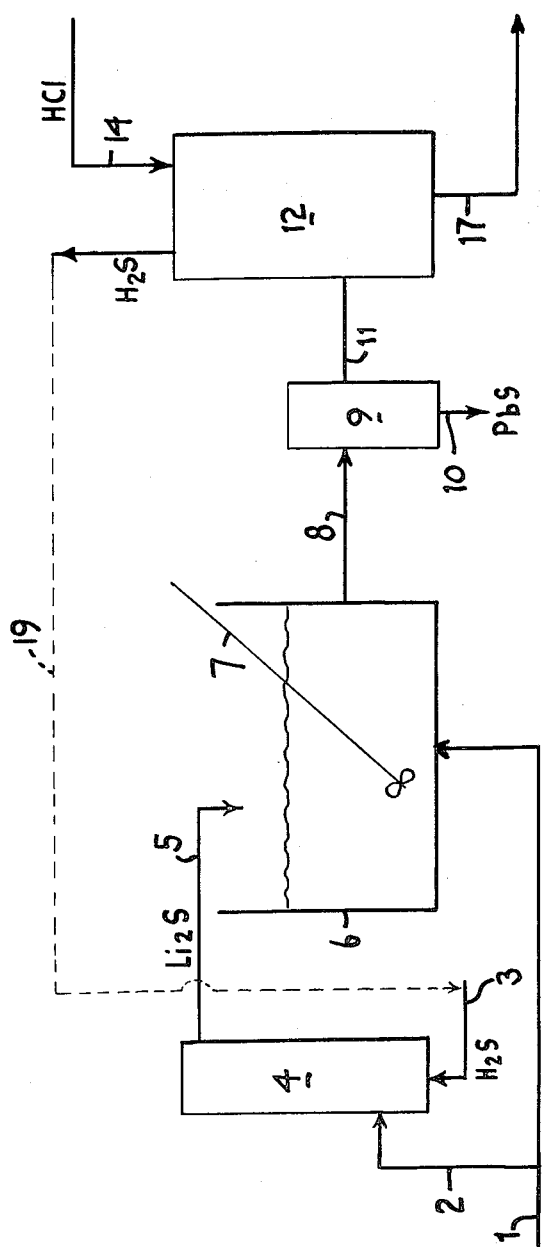

3,671,187
REMOVAL OF DISSOLVED LEAD FROM ALKALI
METAL CHLORIDE CONTAINING SOLUTIONS
Ephraim A. Cuevas, Corpus Christi, Tex., assignor to
PPG Industries, Inc., Pittsburgh, Pa.
Filed July 13, 1970, Ser. No. 54,406
Int. Cl. C01d 3/04, 11/02
U.S. Cl. 23—89
6 Claims

ABSTRACT OF THE DISCLOSURE

A process is described for the removal of lead from alkali metal chloride containing solutions by precipitation of the lead ions as a lead sulfide. The method involves utilizing an alkali metal sulfide as the precipitating agent in lieu of hydrogen sulfide. The use of alkali metal sulfide as the precipitating agent precipitates the lead in large particle sizes rendering filtration easy. The quantity of sulfide ions in the solutions necessary to accomplish precipitation of dissolved lead is also minimized. Treatments of solutions by the proposed scheme show reductions of the lead content of solutions treated from quantities of 0.6 percent by weight to 18 parts per million or less lead. The process is described in particular in connection with the treatment of lithium chloride-lithium hydroxide solutions containing contaminating lead ions and utilizing lithium sulfide as the precipitating agent.

BACKGROUND OF THE INVENTION

In Canadian Pat. 813,925 a process is described for the manufacture of alkyl lead compounds utilizing lithium metal as an essential ingredient in the reaction system employed. In the process described in the aforementioned Canadian patent, lithium metal, lead metal and alkyl halide are reacted in an autoclave to provide tetraalkyllead compounds, typically tetraethyllead and tetramethyllead. Also produced during this reaction is lithium chloride which is formed by the reaction of the halide of the alkyl halide with the lithium metal present.

After completion of the reaction, the reactor charge or mass is typically dropped into a dissolver or flash tank where it is contacted with water to dissolve the alkali metal halide, phase separated, and the water phase passed to storage. This water phase contains lithium chloride and lithium hydroxide as well as substantial quantities of dissolved lead. In the flow sheet shown in the aforementioned Canadian patent, water from the solid lead washing operation is also fed to the storage area that is used for storing lithium chloride-lithium hydroxide solutions thus contributing further quantities of dissolved lead. The lithium chloride-lithium hydroxide solutions so formed are subsequently processed to crystallize lithium chloride therefrom. These lithium chloride crystals are electrolyzed to recover metallic lithium so that this valuable metal can be used again in the initial reaction charge.

These lithium chloride solutions from which lithium chloride crystals are recovered for ultimate recovery of the lithium metal by electrolysis contain, in addition to lithium hydroxide, considerable quantities of dissolved lead. Lead contamination in lithium chloride presents a particularly bothersome problem during the electrolysis of lithium chloride in that quite frequently short circuiting of the electrodes takes place due to the presence of contaminating quantities of lead at the bottom of the cell. For this reason it is extremely important that the lead in these lithium chloride solutions be removed prior to subjecting them to crystallization procedures for the recovery of lithium chloride. High purity lithium chloride crystals substantially free of lead contamination can be prepared only by virtually removing the lead ions from solution before crystallizing the lithium chloride.

THE PRESENT INVENTION

In accordance with the present invention a method of precipitating lead, dissolved inorganic lead in particular, from aqueous solutions is provided. The invention involves contacting alkali metal chloride solutions containing contaminating quantities of dissolved lead compounds with alkali metal sulfide to thereby convert the lead compounds contained in the solution to lead sulfide. In particular the invention provides an extremely efficient method of removing dissolved lead from lithium chloride containing solutions having dissolved lead therein by the addition thereto of lithium sulfide. The quantity of alkali metal sulfide utilized is usually slightly in excess of that stoichiometric quantity necessary to precipitate all lead present in the solution usually above about 8 percent excess and in general 1 to 15 percent excess.

In utilizing the instant invention, precipitation of lead sulfide from solution is accomplished preferably by utilizing the sulfide of the same alkali metal which is the primary constituent of the solution and thus the desired metal itself is not lost.

In precipitating lead sulfide from aqueous alkali metal chloride solutions containing contaminating quantities of lead compounds utilizing hydrogen sulfide as the precipitating agent, the results leave much to be desired. It has been found when utilizing hydrogen sulfide for this purpose that the lead sulfide particles formed are extremely small and settle only with difficulty in the solutions treated. This slow settling of small particles of sulfide requires considerable effort on the part of the processor to remove the fine precipitated sulfides. In addition it is found that substantial saturation of the solution with sulfide ions is necessary to insure the maximum amount of alkali metal sulfide formation. Despite the supersaturation of these solutions with sulfide ions using hydrogen sulfide as a precipitating agent, inadequate removal of lead from these solutions has been experienced.

Utilizing the alkali metal sulfide additions of the instant invention rather than gaseous hydrogen sulfide to precipitate contaminating quantities of lead occurring in alkali metal chloride solutions, large particles of lead sulfide are formed. Essentially complete reaction of the lead contained in the solution is obtained. This is especially so where agitation is also provided during the mixing of the alkali metal sulfide with the solution containing the contaminating quantities of dissolved lead. By providing fast settling, large sulfide particles, and essentially complete reaction in the solutions treated, it is now possible utilizing the instant invention to carefully control the lead content of alkali metal chloride solutions so that only minute quantities of lead are found therein after treatment.

The utilization of the instant process still contemplates the use of hydrogen sulfide as the primary source of sulfide ions. Thus, in preparing alkali metal sulfides for use in accordance with the instant invention, hydrogen sulfide is typically employed as the sulfide ion supply. In addition, hydrogen sulfide utilized in the formation of alkali metal sulfides for use in the instant invention may be reused in the process by treating the process streams after alkali metal sulfide treatment to recover the hydrogen sulfide contained therein. These and other advantages of the instant invention will become apparent in the ensuing description.

As set forth above, the invention is applicable to the removal of lead compounds from any alkali metal chloride solution utilizing alkali metal sulfides as the precipitating agent. In particular the invention has been found extremely useful in removing dissolved lead compounds from solutions of lithium chloride containing lithium hydroxide. Such aqueous solutions of lithium chloride are produced in the process described in Canadian Pat. 813,925. Lithium chloride-lithium hydroxide solutions containing at least 0.10 percent lead therein can be reduced in lead content to at least 5 parts per million.

For a more complete understanding of the application of this invention, reference is made to the accompanying drawing which diagrammatically illustrates the instant invention applied to a lithium chloride—lithium hydroxide solution.

As shown in the drawing, an aqueous solution of lithium chloride containing lithium hydroxide and dissolved inorganic lead compounds is passed through line 1 into an agitated vessel 6. A small bleed stream 2 is removed from the stream in conduit 1 and is passed to a reaction vessel 4 which has bubbled through it via line 3 hydrogen sulfide gas. The hydrogen sulfide gas and the small stream introduced into the reaction vessel 4 are intimately contacted in this vessel 4 to provide for reaction of the hydrogen sulfide gas with some of the dissolved lead present and with the lithium hydroxide present. Reaction of the hydrogen sulfide with the lithium hydroxide forms lithium sulfide and water in accordance with the following equation:

$$2LiOH + H_2S \rightarrow Li_2S + 2H_2O$$

The solution thus formed and containing therein lithium sulfide and suspended lead sulfide particles is then introduced via line 5 into the vessel or tank 6. In vessel 6 an agitator 7 is actuated to provide thorough mixing of the stream entering the tank through line 1 and the stream entering the tank through line 5. This agitation provides intimate contact of the lithium sulfide entering via line 5 with dissolved lead compounds contained in the lithium chloride solutions entering via line 1. These lead compounds are typically lead chloride and lead hydroxide. The lithium sulfide reacts with these compounds in accordance with the following equations:

$$Li_2S + PbCl_2 \rightarrow 2LiCl + PbS$$

$$Li_2S + Pb(OH)_2 \rightarrow 2LiOH + PbS$$

The lead sulfide particles so produced in the tank 6 are large and may be recovered easily by a simple filtration step. Thus, a stream from the vessel 6 is passed via line 8 to a filter 9. The lead sulfide particles are filtered therein and removed via line 10. The filtrate, containing essentially lithium chloride and lithium hydroxide with a lead content of below 10 parts per million, is then introduced into a vessel 12. Hydrogen chloride is added thereto via line 14. The addition of hydrochloric acid to the tank results in the formation of hydrogen sulfide. The purified lithium chloride solution product stream leaves the system via line 17 to appropriate crystallization equipment. Hydrogen sulfide generated in vessel 12 is returned via line 19 for reuse in tank 4.

Example

In a typical operation utilizing the instant invention in equipment similar to that illustrated in the drawing a solution containing 39 percent lithium chloride, 2.2 percent lithium hydroxide, 0.18 percent sodium chloride and 0.63 percent lead was adjusted to a pH of 13 and then feed to agitated tank 6. Into the agitated tank 6 was fed an aqueous solution of lithium sulfide via line 5. Sufficient lithium sulfide over that amount stoichiometrically necessary to supply enough sulfide ions to react with all lead in the solution in tank 6 and convert it to lead sulfide was present in tank 6. The solutions were agitated with a stirrer 7 after the addition of the lithium sulfide to tank 6 and lead sulfide was precipitated in the vessel 6. The solution containing precipitated lead sulfide was removed from vessel 6 and filtered in filter 9 to remove the lead sulfide. The filtrate was then passed via line 11 to a tank 12 where it was adjusted to a pH of 7.8 with an inorganic mineral acid, e.g., HCl. During this adjustment hydrogen sulfide was evolved from the pH treatment tank 12 and is passed via line 19 to tank 4. The material in tank 12 was then removed via line 17 and filtered. About 0.5 percent solid material (basis total solution) was removed in this filtering step. The filter cake had the following composition: less than 10 percent lithium; 1 to 10 percent aluminum; 0.1 to 1 percent silicon and sodium; 0.01 to 0.1 percent magnesium and iron; 0.001 to 0.01 percent manganese, molybdenum, chromium, lead, copper titanium and cadmium; less than 0.001 percent vanadium and silver. The filtrate contained 35.4 percent lithium chloride, 0.02 percent lithium hydroxide, 0.15 percent sodium chloride, 10 parts per million lead and 53 parts per million sulfur.

From the foregoing, it will be readily appreciated that the process of the instant invention lends itself readily to the removal of large quantities of lead to very low levels in alkali chloride metal solutions.

While the invention has been described with specific reference to lithium chloride solutions, obviously the invention has efficacy also with other alkali metal chloride solutions contaminated with dissolved lead. Thus, sodium chloride solutions containing contaminated quantities of lead can be treated in the same manner. In treating sodium chloride solutions the use of sodium sulfide as the precipitating agent rather than lithium sulfide is preferred though other alkali metal sulfides can be used. Thus, in general where an alkali metal chloride solution is contaminated with lead and it is desired to remove the lead therefrom, it is preferable to utilize the same alkali metal as a sulfide to precipitate lead from that particular solution. Where mixed chloride solutions are encountered the alkali metal sulfide utilized preferably will be alkali metal which predominates in weight quantity in the solution. Thus, a mixed potassium chloride-sodium chloride solution containing predominant quantities of potassium chloride will, in the preferred operation, result in the use of potassium sulfide as the precipitating agent. Obviously in such mixed solutions, mixed alkali metal sulfides may also be employed if desired.

The quantities of sulfide used are generally in excess of the stoichiometric quantity of sulfur required to react with all dissolved lead present in the solutions treated. This excess as has been stated is typically 1 to 15 percent. In treating the initial bleed stream to prepare the alkali metal sulfide solution used to treat the alkali metal chloride solution for lead removal, large excesses of hydrogen sulfide may be employed. In general the solutions of alkali metal sulfide prepared for use in the instant process are satuared with sulfide ions. While these solutions may contain any quantity of alkali metal sulfide and effectively perform in the process of the instant invention, they generally contain 5 to 20 percent by weight alkali metal sulfide as used to treat the alkali metal chloride solutions contaminated with lead.

In general, all of the mixing of solutions and reactions take place at ambient conditions of temperature and under atmospheric pressure. This does not preclude use of the invention at elevated temperature nor the use of super or sub atmospheric pressures.

While the invention has been described with reference to a specific illustrated embodiment, it is not intended that it be limited thereby except insofar as appears in the accompanying claims.

I claim:

1. A method of precipitating dissolved lead from aqueous alkali metal chloride solutions containing contaminating quantities of soluble lead compounds, comprising contacting said aqueous alkali metal chloride solutions with a corresponding alkali metal sulfide to convert the lead compounds contained therein to lead sulfide (PbS), the quantity of alkali metal sulfide being slightly in excess of that stoichiometric quantity necessary to convert all soluble lead present therein to lead sulfide (PbS), precipitating the lead sulfide so formed from the solution, removing the lead sulfide from the solution and recovering an alkali metal chloride solution substantially depleted of soluble lead compounds.

2. A method of reducing the dissolved lead content of a lithium chloride-lithium hydroxide aqueous solution containing dissolved lead, comprising contacting a portion of said solution with hydrogen sulfide to thereby react the hydrogen sulfide with lithium hydroxide present to form lithium sulfide, introducing solution so treated and containing lithium sulfide into the main body of solution to be reduced in lead content, agitating the main body of solution and reacting the lithium sulfide with the dissolved lead in the main body of solution to thereby form lead sulfide therein, removing the lead sulfide so formed from the main body of solution and recovering the main body of solution substantially reduced in dissolved lead content.

3. The method of claim 2 wherein the lithium chloride-lithium hydroxide aqueous solution contains at least 0.10 percent by weight lead and the lead content thereof is reduced to at least 5 parts per million.

4. The method of claim 1 wherein the solution is an aqueous solution containing lithium chloride and lithium hydroxide.

5. A method of removing dissolved lead impurities from an aqueous solution containing lithium chloride and lithium hydroxide, comprising adding to said solution lithium sulfide in a quantity sufficient to react with the lead present to form lead sulfide and removing the lead sulfide formed by the lithium sulfide addition to provide a lithium chloride-lithium hydroxide solution substantially depleted of lead contamination.

6. A method of purifying an aqueous stream of lithium chloride and lithium hydroxide containing contaminating quantities of dissolved inorganic lead, comprising feeding a portion of said stream to a reaction zone, introducing into the reaction zone hydrogen sulfide and contacting the said hydrogen sulfide with the portion of the stream fed thereto to convert some of the lead present to lead sulfide and to thereby convert lithium hydroxide present to lithium sulfide, removing a stream containing lithium sulfide from the said reaction zone and contacting the major stream with the stream from the reaction zone, converting the dissolved inorganic lead present in said major stream to lead sulfide by reaction of lithium sulfide therewith, removing the lead sulfide so formed from the major stream, treating the major stream after lead removal with an inorganic mineral acid to generate hydrogen sulfide from the excess lithium sulfide present and feeding the hydrogen sulfide so generated to the said reaction zone.

References Cited

UNITED STATES PATENTS

| | | | |
|---|---|---|---|
| 2,703,272 | 3/1955 | Fuchsman | 23——89 |
| 2,655,483 | 10/1953 | Holtzclaw | 23—134 X |
| 2,060,108 | 11/1936 | Oberseider et al. | 23—184 X |
| 1,572,268 | 2/1926 | Christensen | 23—134 X |

FOREIGN PATENTS 14,055    9/1962    Japan _____ 23—134

OTHER REFERENCES

J. W. Mellor's: "A Comprehensive Treatise on Inorganic and Theoretical Chem.," vol. 2, 1922 ed., pp. 66, 67. Longmans, Green & Co., New York.

EDWARD STERN, Primary Examiner

U.S. Cl. X.R.

23—134, 184; 204—68